US009712102B2

(12) United States Patent
Lee et al.

(10) Patent No.: US 9,712,102 B2
(45) Date of Patent: Jul. 18, 2017

(54) PROGRAMMING CONTROL METHOD FOR SERVO FAN AND PROGRAMMING CONTROL DEVICE THEREOF

(71) Applicant: Nuvoton Technology Corporation, Hsinchu (TW)

(72) Inventors: Pang-Neng Lee, Hsinchu (TW); Yuan-Chuan Yu, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 217 days.

(21) Appl. No.: 14/693,889

(22) Filed: Apr. 23, 2015

(65) Prior Publication Data

US 2016/0077506 A1 Mar. 17, 2016

(30) Foreign Application Priority Data

Sep. 15, 2014 (TW) .............................. 103131784 A

(51) Int. Cl.
| | | |
|---|---|---|
| *G05B 19/10* | (2006.01) | |
| *G01R 31/02* | (2006.01) | |
| *H02P 29/00* | (2016.01) | |
| *F04D 25/06* | (2006.01) | |
| *F04D 27/00* | (2006.01) | |
| *G06F 9/445* | (2006.01) | |
| *H02K 11/30* | (2016.01) | |
| *H02P 31/00* | (2006.01) | |

(52) U.S. Cl.
CPC ............ *H02P 29/00* (2013.01); *F04D 25/068* (2013.01); *F04D 25/0693* (2013.01); *F04D 27/00* (2013.01); *G06F 8/665* (2013.01); *H02K 11/30* (2016.01); *H02P 31/00* (2013.01)

(58) Field of Classification Search
CPC ..... G05B 19/02; G05B 19/0426; H02P 29/00; H02K 11/0068; F04D 27/004; F04D 25/068; F04D 25/0693; G06F 8/665; G11C 16/34
USPC ......................................................... 318/567
See application file for complete search history.

(56) References Cited

U.S. PATENT DOCUMENTS

2014/0203749 A1* 7/2014 Wu ......................... H02P 31/00
318/490

\* cited by examiner

*Primary Examiner* — Bentsu Ro
*Assistant Examiner* — Zemenay Truneh
(74) *Attorney, Agent, or Firm* — Jianq Chyun IP Office

(57) ABSTRACT

A programming control method for a servo fan and a programming control device thereof are provided in the embodiment of the invention. The programming control device is coupled to a motor. The programming control device includes an input/output interface, a micro processing unit and a function circuit. The function circuit is coupled to the input/output interface and the micro processing unit. The function circuit updates the firmware according to a magnitude of an operation voltage.

11 Claims, 4 Drawing Sheets

PROGRAMMING CONTROL METHOD FOR SERVO FAN AND PROGRAMMING CONTROL DEVICE THEREOF

CROSS-REFERENCE TO RELATED APPLICATION

This application claims the priority benefit of Taiwan application serial no. 103131784, filed on Sep. 15, 2014. The entirety of the above-mentioned patent application is hereby incorporated by reference herein and made a part of this specification.

BACKGROUND

Technical Field

The invention relates to a servo fan technique, and particularly relates to a programming control method for servo fan and a programming control device thereof.

Related Art

Servo fan is a small fan applied in a host (or a server), and the servo fan includes a mechanism shell, a circuit board and a motor. The servo fan has an input/output interface connected to the host, and the input/output interface is generally a four-line fan flat cable, which is used for coupling an operation voltage (12V), a ground voltage (GND), a frequency generator (FG) signal and a voltage of speed (VSP) signal.

After the servo fan is manufactured, when the firmware has to be updated due to a specific requirement, following conventional methods can be used for implementation. A first method is to disassemble the mechanism shell of the motor, though it is inconvenient in operation. A second method is that besides the original fan flat cable, the servo fan is further configured with an input/output interface specified for programming application, though such method may additionally increase a cable cost. A third method is to stick a probe of a programming tool into internal of the servo fan from the mechanism shell, and point the probe against a programming contact on the circuit board for programming, though such method is required to change an original mechanism design.

Moreover, the mechanism shell of the servo fan has a hollow out region and a non-hollow out region at an air outlet of the servo fan, and the circuit board of the servo fan is generally configured at the non-hollow out region. Since an area of the non-hollow out region is smaller than that of the hollow out region, and the non-hollow out region has a round shape, a shape of the circuit board is also a round with a diameter of about 2 cm. As the circuit board has a limited area, the third method is hard to implement pointing the probe against the programming contact on the circuit board.

In addition, the related art (Pub. No.: US 2014/0203749 A1) proposes a motor controller, which is used for improving an integrated circuit (IC) of a motor controller. The motor controller is working as a new micro processing unit. While such re-designed micro processing unit is configured to the circuit board of the servo fan, it is necessary to modify the all related circuits of the entire structure, and results in increases manufacturing cost. The motor controller proposed in the related art (Pub. No.: US 2014/0203749 A1) requires a predefined signal to activate a programming mode and then starts programming function upon receipt of the predefined signal. However, a general programmer is usually not embedded with this function of generating the predefined signal to activate a programming mode of the motor controller.

SUMMARY

The invention is directed to a programming control method for servo fan and a programming control device thereof.

An embodiment of the invention provides a programming control device. The programming control device can be coupled to a motor. The programming control device includes an input/output interface, a micro processing unit and a function circuit. The input/output interface includes a first connection line, a second connection line, a third connection line and a fourth connection line. The first connection line is coupled to an operation voltage, the second connection line is coupled to a ground voltage, the third connection line is used for outputting a frequency generator signal or receiving a clock signal, and the fourth connection line is used for receiving a voltage of speed signal, or receiving and outputting a programming data signal. The micro processing unit has a plurality of pins and has a non-volatile memory. The non-volatile memory stores a firmware used for driving the motor. The function circuit is coupled to the input/output interface and the micro processing unit. The function circuit determines whether the micro processing unit enters a programming mode to update the firmware according to a magnitude of the operation voltage.

According to another aspect, another embodiment of the invention provides a programming control method for servo fan, which includes following steps. An input/output interface and a micro processing unit are provided, where the input/output interface includes a first connection line, a second connection line, a third connection line and a fourth connection line, the first connection line is coupled to an operation voltage, the second connection line is coupled to a ground voltage, the third connection line is used for outputting a frequency generator signal or receiving a clock signal, and the fourth connection line is used for receiving a voltage of speed signal, or receiving and outputting a programming data signal, the micro processing unit has a plurality of pins and has a non-volatile memory, where the non-volatile memory stores a firmware used for driving a motor. A function circuit is provided for coupling to the input/output interface and the micro processing unit. The function circuit is used to determine whether the micro processing unit enters a programming mode to update the firmware according to a magnitude of the operation voltage.

According to another aspect, an embodiment of the invention provides a programming control device. The programming control device can be coupled to a motor. The programming control device includes an input/output interface, a micro processing unit and a function circuit. The input/output interface includes a first connection line, a second connection line, a third connection line and a fourth connection line. The first connection line is coupled to an operation voltage, the second connection line is coupled to a ground voltage, the third connection line is used for outputting a frequency generator signal or receiving a clock signal, and the fourth connection line is used for receiving a voltage of speed signal, or receiving and outputting a programming data signal. The micro processing unit has a plurality of pins and has a non-volatile memory. The non-volatile memory stores a firmware used for driving the motor. The function circuit is coupled to the input/output interface and the micro processing unit. The micro processing unit determines whether to enter a programming mode to update the firmware at a first time interval after power-on according to whether transmitted data come from the function circuit has a predetermined information.

According to another aspect, another embodiment of the invention provides a programming control method for servo fan, which includes following steps. An input/output interface and a micro processing unit are provided, where the input/output interface includes a first connection line, a second connection line, a third connection line and a fourth connection line, the first connection line is coupled to an operation voltage, the second connection line is coupled to a ground voltage, the third connection line is used for outputting a frequency generator signal or receiving a clock signal, and the fourth connection line is used for receiving a voltage of speed signal, or receiving and outputting a programming data signal, the micro processing unit has a plurality of pins and has a non-volatile memory, where the non-volatile memory stores a firmware used for driving the motor. A function circuit is provided for coupling to the input/output interface and the micro processing unit. The micro processing unit is used to determine whether to enter a programming mode to update the firmware at a first time interval after power-on according to whether transmitted data come from the function circuit has a predetermined information.

According to the above descriptions, in the embodiments of the invention, it is unnecessary to change a mechanism design of the servo fan, and unnecessary to configure another input/output interface specified for the programming application, and it is only required to add the function circuit to the circuit board or to internal of an IC. When the firmware of the servo fan is updated, the input/output interface of the servo fan can be connected to an external programmer. The function circuit is capable of updating the firmware according to a magnitude of the operation voltage (whether the operation voltage is greater than or smaller than a predetermined voltage), or the micro processing unit determines whether to enter a programming mode to update the firmware at the first time interval after power-on according to whether the transmitted data come from the function circuit has a predetermined information. In this way, it is unnecessary to disassemble the mechanism shell when the firmware is updated, and unnecessary to additionally add an input/output interface to increase a cable cost. Therefore, compared to the conventional technique, firmware updating of the invention is easy and efficient.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
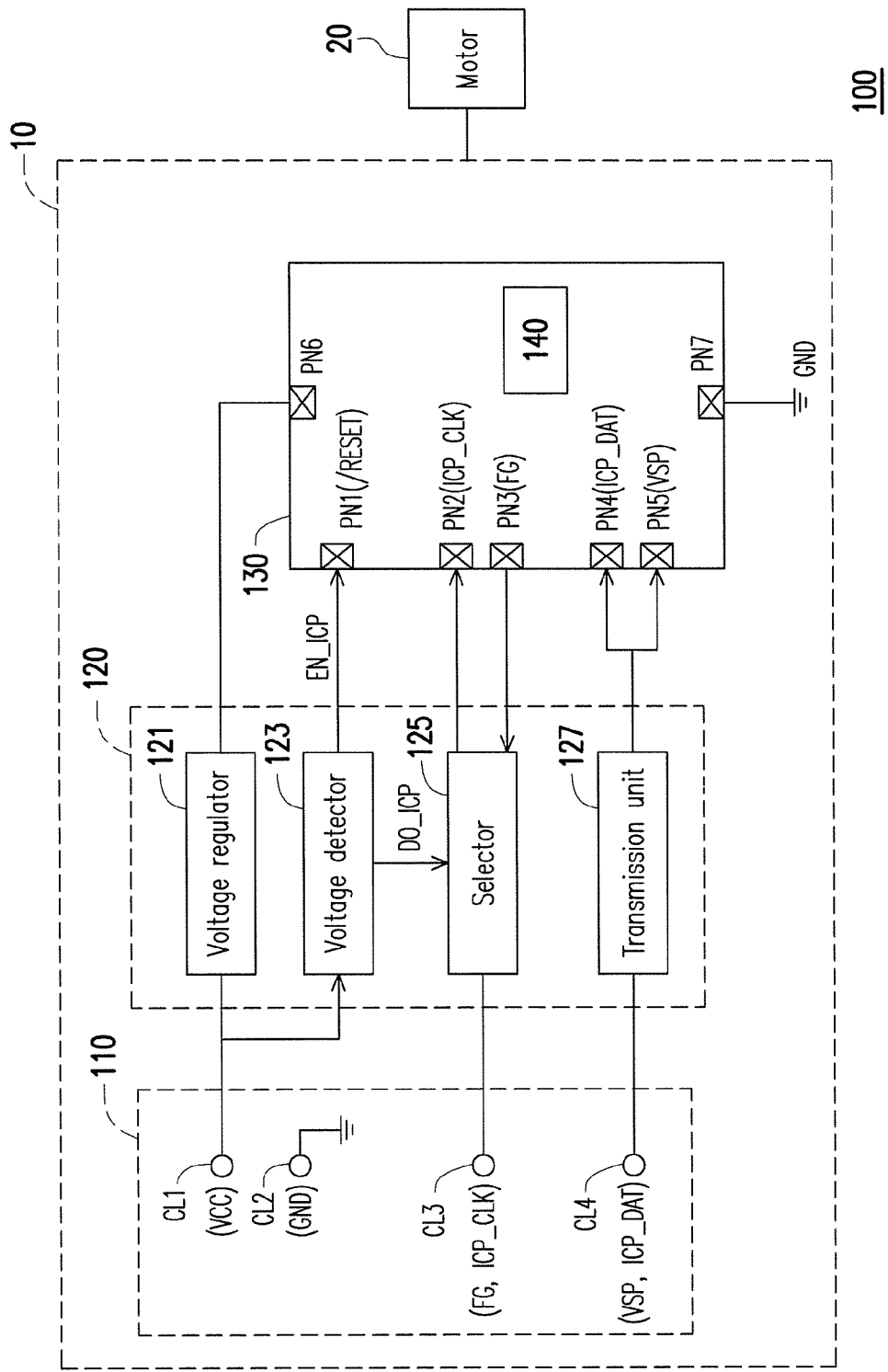
FIG. 1 is a block diagram of a servo fan according to an embodiment of the invention.

Reference will now be made in detail to the present preferred embodiments of the invention, examples of which are illustrated in the accompanying drawings. Wherever possible, the same or like reference numbers are used in the drawings and the description to refer to the same or like parts.

FIG. 1 is a block diagram of a servo fan according to an embodiment of the invention. Referring to FIG. 1, the servo fan 100 includes a programming control device 10 and a motor 20. The programming control device 10 includes an input/output interface 110, a function circuit 120 and a micro processing unit 130. Moreover, after the servo fan 100 is manufactured, the programming control device 10 and the motor 20 are installed in internal of a mechanism shell (not shown). Various components and operation principle of the programming control device 10 are described in detail below.

The input/output interface 110 can be a four-line fan flat cable, though the invention is not limited thereto. The micro processing unit 130 is an integrated circuit (IC). The function circuit 120 and the micro processing unit 130 can be configured on a same circuit board, or the function circuit 120 can be integrated into the IC. A first connection line CL1, a second connection line CL2, a third connection line CL3 and a fourth connection line CL4 in the input/output interface 110 are respectively coupled to an operation voltage VCC (for example, a direct current (DC) voltage 5V or 12V), a ground voltage GND, a frequency generator signal FG (or a clock signal ICP_CLK) and a voltage of speed signal VSP (or a programming data signal ICP_DAT). The micro processing unit 130 has a plurality of pins (PN1-PN7) and has a non-volatile memory 140. The non-volatile memory 140 stores a firmware used for driving the motor 20.

Moreover, although the non-volatile memory 140 of FIG. 1 is configured in internal of the micro processing unit 130, the invention is not limited thereto, and in other embodiments, the micro processing unit 130 can also be an external non-volatile memory.

Moreover, the function circuit 120 and the micro processing unit 130 can be included in a same IC.

The function circuit 120 is coupled to the input/output interface 110 and the micro processing unit 130. The function circuit 120 includes a voltage regulator 121, a voltage detector 123, a selector 125 and a transmission unit 127. The voltage regulator 121 and the voltage detector 123 are coupled to the first connection lien CL1 for receiving the operation voltage VCC. The voltage regulator 121 converts the operation voltage VCC into an output DC voltage level (for example, 5V or 12V) and outputs the output DC voltage level to the six pin PN6. The seventh pin PN7 is coupled to the ground voltage GND.

It is worth mentioning that the motor controller of the related art (Pub No.: US 2014/0203749 A1) is merely similar function as the micro processing unit 130 in FIG. 1. However, the related art does not take into account the input/ output interface 110 and the function circuit 120 of the embodiment of the invention. Furthermore, the connection lines of the input/output interface 110 are non-equivalent to the pins of the micro processing unit 130 (or the IC).

According to the above description, it is known that only the function circuit 120 is added to the circuit board configured with the micro processing unit 130. Compared to the conventional technique, it is unnecessary to change a mechanism design of the servo fan 100, and is unnecessary to additionally install an input/output interface (or a flat cable) specified for programming application.

Various programming embodiments of the function circuit 120 are described in detail below.

Regarding a first programming embodiment, a principle thereof is that the voltage detector 123 of the function circuit 120 determines whether to enter a programming mode to update the firmware of the micro processing unit 130 according to a magnitude of the operation voltage VCC (for example, the operation voltage is greater than a predetermined voltage 6V or is smaller than the predetermined voltage 6V, which is not limited by the invention, and details thereof are as follows.

Figure 2:
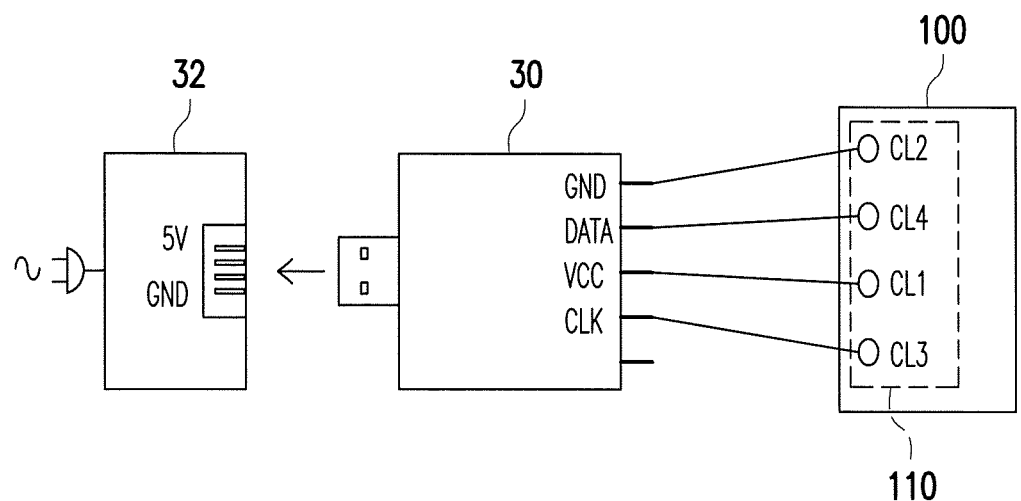
FIG. 2 is a schematic diagram of a firmware updating operation according to an embodiment of the invention.

FIG. 2 is a schematic diagram of a firmware updating operation according to an embodiment of the invention. Referring to FIG. 1 and FIG. 2, when the user uses a programmer 30 to update the firmware, the programmer 30 is coupled to the input/output interface 110. The programmer 30 receives a DC voltage of 5V through a USB interface of a power adaptor 32, such that the operation voltage VCC provided by the programmer 30 is also 5V. Since the operation voltage VCC (5V) is lower than the predetermined voltage (6V), the voltage detector 123 outputs a control signal DO_ICP and outputs an enable signal EN_ICP to the first pin PN1, so as to enable the micro processing unit 130 to enter a programming mode to update the firmware. That is, the programmer 30 can be directly coupled to the input/output interface 110 and starts to update the firmware without outputting an extra predefined signal to activate the programming mode, so the general programmer can still be applied in programming control device of the present invention. As such, the technical feature of the present invention solves the problem as mentioned in the related art, and improves the usage convenience in updating the firmware of the servo fan.

Figure 3:
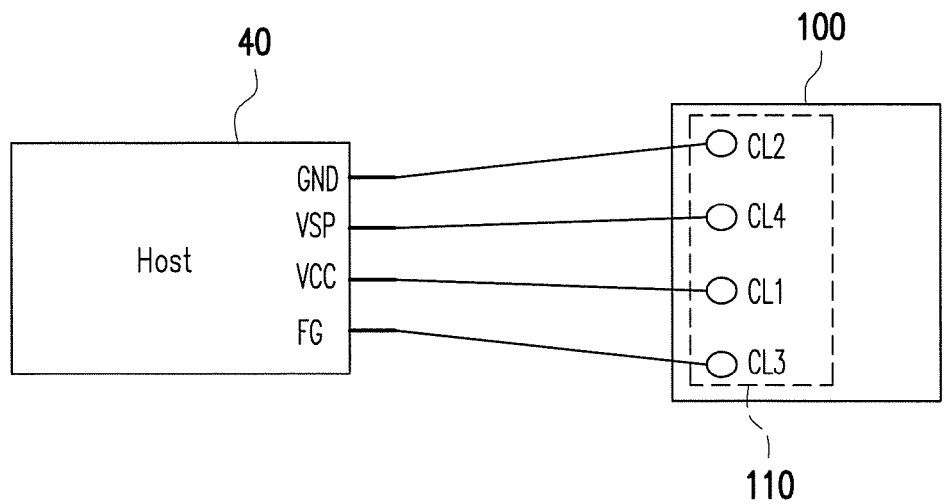
FIG. 3 is a schematic diagram of a normal operation according to an embodiment of the invention.

FIG. 3 is a schematic diagram of a normal operation according to an embodiment of the invention. Referring to FIG. 1 and FIG. 3, under a normal mode, the input/output interface 110 of the servo fan 100 is connected to a host 40. The operation voltage VCC provided by the host 40 is a DC voltage of 12V. Since the operation voltage VCC (12V) is not lower than the predetermined voltage (6V) (for example, the operation voltage VCC (12V) is greater than or equal to the predetermined voltage (6V)), the voltage detector 123 does not output the control signal DO_ICP and the enable signal EN_ICP.

The selector 125 switches a connection path between the second pin PN2 or the third pin PN3 and the third connection line CL3 according to the control signal DO_ICP. Moreover, the first pin PN1 is a reset pin/RESET. The second pin PN2 and the third pin PN3 are respectively a programming (for example, an in-circuit programming) clock pin and a frequency generator output pin.

When the control signal DO_ICP indicates that the operation voltage VCC is lower than the predetermined voltage, the third pin PN3 presents a high impedance and the selector 125 turns on the connection path between the third connection line CL3 and the second pin PN2, such that the second pin PN2 receives the clock signal ICP_CLK from the external programmer 30. When the control signal DO_ICP indicates that the operation voltage VCC is not lower than the predetermined voltage, the second pin PN2 presents the high impedance and the selector 125 turns on the connection path between the third connection line CL3 and the third pin PN3, such that the third pin PN3 receives the frequency generator signal FG from the motor 20.

Moreover, the signal received by the transmission unit 127 is influenced by the programmer 30 or the host 40, and a signal amplitude range is probably between 0V and 20V. In order to avoid the output signal amplitude to be too large, the transmission unit 127 transmits data to the micro processing unit 130 in a non-distortion manner, which ensures that the signal variation is within an acceptable voltage range (for example, 0V to 5V) of the micro processing unit 130 without signal distortion. When the micro processing unit 130 receives the enable signal EN_ICP, the fifth pin PN5 presents a high impedance and the fourth pin PN4 serves as an input pin of the programming data signal ICP_DAT for implementing the operation of updating the firmware. When the micro processing unit 130 does not receive the enable signal EN_ICP, in the normal operation, the fourth pin PN4 presents the high impedance and the fifth pin PN5 serves as an input pin of the voltage of speed signal VSP.

Moreover, the fourth pin PN4 is a programming data signal pin, which is used for receiving the programming data signal ICP_DAT. The fifth pin PN5 is a voltage of speed signal input pin, which is used for receiving the voltage of speed signal VSP.

Another firmware updating method can be implemented based on the structure of the servo fan of FIG. 1. Coupling relations of various components are similar as that described in the aforementioned descriptions, which are not repeated.

Regarding a second programming embodiment, a principle thereof is that the micro processing unit 130 has a determination mechanism itself, and the micro processing unit 130 determines whether to enter the programming mode to update the firmware at a first time interval after power-on according to whether the transmitted data come from the function circuit 120 (or the transmission unit 127) has a predetermined information. For example, the predetermined information can be a programming data signal of "11110000," though the invention is not limited thereto, and the content of the predetermined information can be changed according to an actual requirement.

The transmission unit 127 transmits the programming data signal (the voltage of speed signal VSP or the programming data signal ICP_DAT) to the micro processing unit 130 in the non-distortion manner, and in case of power-on, the micro processing unit 130 first makes the fifth pin PN5 to present the high impedance and makes the fourth pin PN4 to serve as the input pin of the programming data signal ICP_DAT to perform the firmware updating operation, and the micro processing unit 130 detects the transmitted data come from the function circuit 120 at the first time interval, and if or only if the transmitted data is complied with the predetermined information, the firmware updating operation is performed. After the first time interval, the micro processing unit 130 makes the fourth pin PN4 to present the high impedance, and makes the fifth pin PN5 to serve as the input pin of the voltage of speed signal VSP to perform the normal operation.

The fourth pin PN4 is a programming data signal pin, which is used for receiving the programming data signal ICP_DAT. The fifth pin PN5 is a voltage of speed signal input pin, which is used for receiving the voltage of speed signal VSP.

In the second programming embodiment, the fourth pin PN4 and the fifth pin PN5 can be combined into a composite pin PN4/PN5 (for example, the micro processing unit 130 only has one composite pin PN4/PN5, which is not illustrated). Namely, when the transmission unit 127 transmits the programming data signal (the voltage of speed signal VSP or the programming data signal ICP_DAT) to the micro processing unit 130 in the non-distortion manner, in case of power-on, the micro processing unit 130 first makes the composite pin PN4/PN5 to serve as the input pin of the programming data signal ICP_DAT to perform the firmware updating operation, and the micro processing unit 130 detects the transmitted data come from the function circuit 120 at the first time interval, and if or only if the transmitted data is complied with the predetermined information, the firmware updating operation is performed. After the first time interval, the micro processing unit 130 makes the composite pin PN4/PN5 to serve as the input pin of the voltage of speed signal VSP to perform the normal operation. The composite pin PN4/PN5 can serve as the programming data signal pin and the voltage of speed signal input pin.

Figure 4:
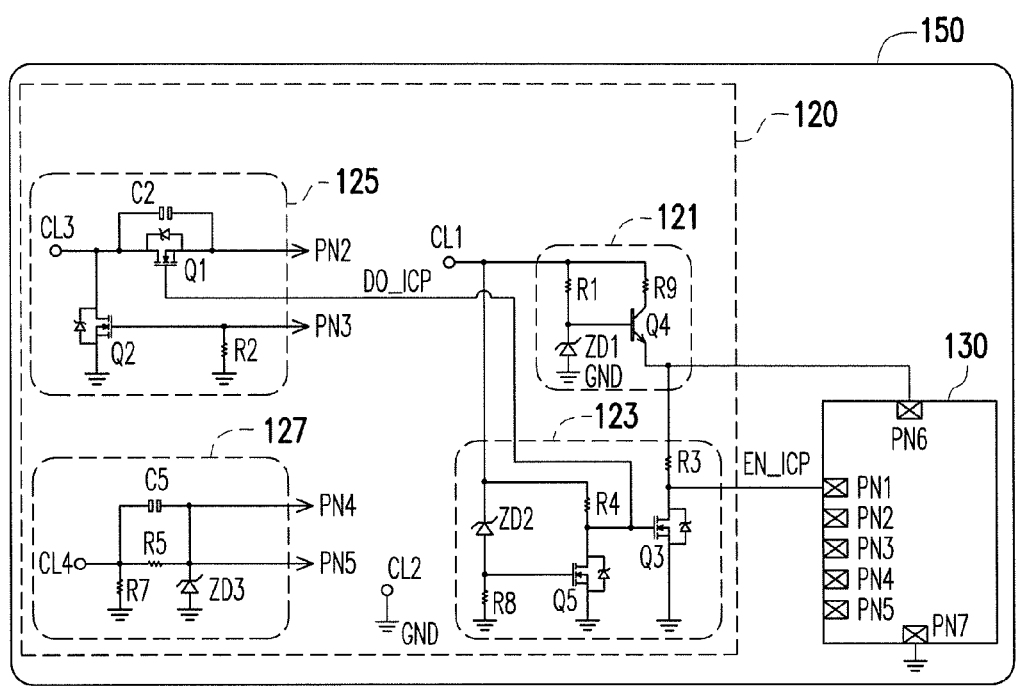
FIG. 4 is a circuit diagram of a programming control device according to an embodiment of the invention.

FIG. 4 is a circuit diagram of a programming control device according to an embodiment of the invention. Referring to FIG. 1 and FIG. 4, the function circuit 120 and the micro processing unit 130 are configured to a same circuit board 150.

The voltage regulator 121 includes resistors R1 and R9, a Zener diode ZD1 and a transistor Q4. The resistor R1 is coupled between the first connection line CL1 and a cathode of the Zener diode ZD1. An anode of the Zener diode ZD1 is coupled to the ground voltage GND. The resistor R9 is coupled between the first connection line CL1 and a collector of the transistor Q4. A base of the transistor Q4 is coupled to the cathode of the Zener diode ZD1. An emitter of the transistor Q4 is coupled to the sixth pin PN6 of the micro processing unit 130.

The voltage regulator 121 receives the operation voltage VCC through the first connection line CL1, the Zener diode ZD1 stabilizes the operation voltage VCC to the output DC voltage level (for example, 5V or 12V), and the output DC voltage level is output to the sixth pin PN6 of the micro processing unit 130 through the transistor Q4.

The voltage detector 123 includes resistors R3, R4 and R8, a Zener diode ZD2 and metal oxide semiconductor (MOS) transistors Q3 and Q5. A cathode of the Zener diode ZD2 is coupled to the first connection line CL1. The resistor R8 is coupled between an anode of the Zener diode ZD2 and the ground voltage GND. One end of the resistor R4 is coupled to the first connection line CL1, and another end of the resistor R4 is coupled to a drain of the MOS transistor Q5. A gate of the MOS transistor Q5 is coupled to the anode of the Zener diode ZD2. A source of the MOS transistor Q5 is coupled to the ground voltage GND. The resistor R3 is coupled between the emitter of the transistor Q4 and a drain of the MOS transistor Q3. A source of the MOS transistor Q3 is coupled to the ground voltage GND. A gate of the MOS transistor Q3 is coupled to the drain of the MOS transistor Q5.

The voltage detector 123 is coupled to the operation voltage VCC through the first connection line CL1. When the operation voltage VCC is lower than the predetermined voltage (6V), the voltage detector 123 outputs the control signal DO_ICP to the selector 125, and outputs the enable signal EN_ICP to the first pin PN1 to enable the micro processing unit 130 to perform the firmware updating operation.

The selector 125 includes a resistor R2, a capacitor C2 and MOS transistors Q1 and Q2. One end of the capacitor C2 is coupled to the third connection line CL3. Another end of the capacitor C2 is coupled to the second pin PN2. Drains of the MOS transistors Q1 and Q2 are coupled to the third connection line CL3. A source of the MOS transistor Q1 is coupled to the second pin PN2. A gate of the MOS transistor Q1 is coupled to the drain of the MOS transistor Q5. A source of the MOS transistor Q2 is coupled to the ground GND. The resistor R2 is coupled between a gate of the MOS transistor Q2 and the ground voltage GND. A gate of the MOS transistor is coupled to the third pin PN3.

The gate of the MOS transistor Q1 switches the connection path of the second pin PN2 or the third pin PN3 according to the control signal DO_ICP.

The transmission unit 127 includes resistors R5 and R7, a Zener diode ZD3 and a capacitor C5. The resistor R7 is coupled between the fourth connection line CL4 and the ground voltage GND. One end of the capacitor C5 is coupled to the fourth connection line CL4. Another end of the capacitor C5 is coupled to the fourth pin PN4, the fifth pin PN5 and a cathode of the Zener diode ZD3. The resistor R5 is coupled in parallel to the capacitor C5. An anode of the Zener diode ZD3 is coupled to the ground voltage GND. The transmission unit 127 transmits data to the fourth pin PN4 or the fifth pin PN5 of the micro processing unit 130 in the non-distortion manner.

Moreover, any one of the voltage regulator 121, the voltage detector 123, the selector 125 and the transmission unit 127 can be modified according to an actual circuit design, and the invention is not limited to the aforementioned implementation.

It is worth mentioning that while a re-design micro processing unit is configured to the circuit board of the servo fan by the motor manufacturer, it is necessary to modify the all related circuits of the entire structure. On the contrary, if or only if the motor manufacturer uses the programming control device 10 of the embodiment of the invention that is unnecessary to modify the original related circuits of the micro processing unit 130.

Figure 5:
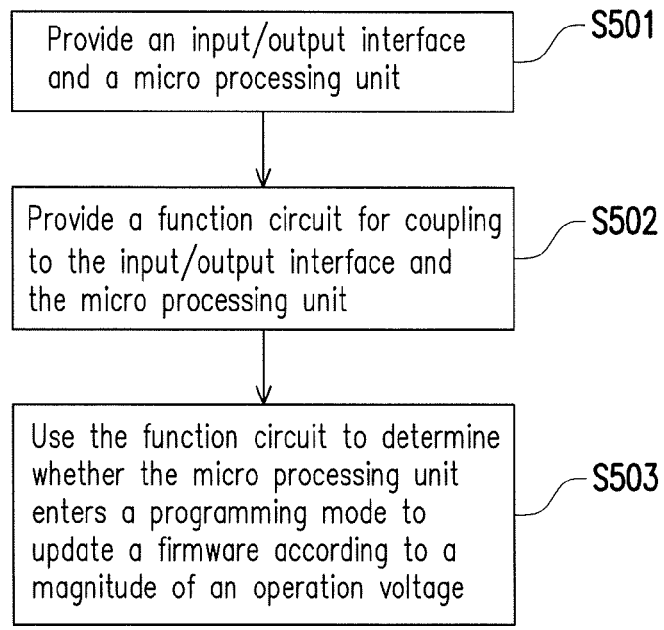
FIG. 5 is a flowchart illustrating a programming control method for servo fan according to another embodiment of the invention.

According to the above descriptions, a programming control method for servo fan can be deduced. In detail, FIG. 5 is a flowchart illustrating a programming control method for servo fan according to another embodiment of the invention. Referring to FIG. 1 and FIG. 5, the programming control method for servo fan includes following steps.

In step S501, the input/output interface 110 and the micro processing unit 130 are provided. The input/output interface 110 includes the first connection line CL1 to the fourth connection line CL4, where the first connection line CL1 is coupled to the operation voltage VCC, the second connection line CL2 is coupled to the ground voltage GND, the third connection line CL3 is used for outputting the frequency generator signal FG or receiving the clock signal ICP_CLK, and the fourth connection line CL4 is used for receiving the voltage of speed signal VSP, or receiving and outputting the programming data signal ICP_DAT. The micro processing unit 130 has a plurality of pins (PN1-PN7) and has the non-volatile memory 140. The non-volatile memory stores the firmware used for driving the motor 20.

In step S502, the function circuit 120 is provided for coupling to the input/output interface 110 and the micro processing unit 130.

In step S503, the function circuit 120 is used to determine whether the micro processing unit 130 enters the programming mode to update the firmware according to a magnitude of the operation voltage VCC (whether the operation voltage VCC is greater than or smaller than a predetermined voltage).

Figure 6:
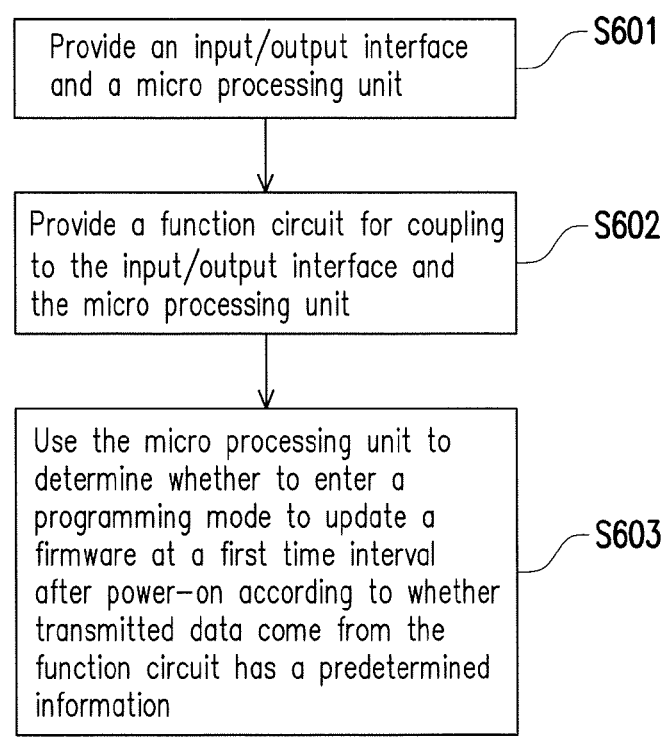
FIG. 6 is a flowchart illustrating a programming control method for servo fan according to another embodiment of the invention.

FIG. 6 is a flowchart illustrating a programming control method for servo fan according to another embodiment of the invention. Referring to FIG. 1 and FIG. 6, the programming control method for servo fan includes following steps.

In step S601, the input/output interface 110 and the micro processing unit 130 are provided. The input/output interface 110 includes the first connection line CL1 to the fourth connection line CL4, where the first connection line CL1 is coupled to the operation voltage VCC, the second connection line CL2 is coupled to the ground voltage GND, the third connection line CL3 is used for outputting the frequency generator signal FG or receiving the clock signal ICP_CLK, and the fourth connection line CL4 is used for inputting the voltage of speed signal VSP, or receiving and outputting the programming data signal ICP_DAT. The micro processing unit 130 has a plurality of pins (PN1-PN7) and has the non-volatile memory 140. The non-volatile memory stores the firmware used for driving the motor 20.

In step S602, the function circuit 120 is provided for coupling to the input/output interface 110 and the micro processing unit 130.

In step S603, the micro processing unit 130 is used to determine whether to enter the programming mode to update the firmware at the first time interval after power-on according to whether the transmitted data come from the function circuit 120 has a predetermined information.

In summary, in the embodiments of the invention, it is unnecessary to change a mechanism design of the servo fan, and unnecessary to configure another input/output interface specified for the programming application, and it is only required to add the function circuit to the circuit board or to internal of an IC. When the firmware of the servo fan is updated, the input/output interface of the servo fan is connected to an external programmer. The function circuit is capable of updating the firmware according to a magnitude of the operation voltage (whether the operation voltage is greater than or smaller than a predetermined voltage), or the micro processing unit determines whether to enter the programming mode to update the firmware at the first time interval after power-on according to whether the transmitted data come from the function circuit has the predetermined information. In this way, it is unnecessary to disassemble the mechanism shell when the firmware is updated, and unnecessary to additionally add an input/output interface to increase a cable cost. Therefore, compared to the conventional technique, firmware updating of the invention is easy and efficient.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

Moreover, any embodiment of or the claims of the invention is unnecessary to implement all advantages or features disclosed by the invention. Moreover, the abstract and the name of the invention are only used to assist patent searching, and are not used to be limiting of the invention.

What is claimed is:

1. A servo fan comprising a programming control device coupled to a motor, the programming control device comprising:
   an input/output interface, having a first connection line, a second connection line, a third connection line and a fourth connection line, wherein the first connection line is coupled to an operation voltage, the second connection line is coupled to a ground voltage, the third connection line is used for outputting a frequency generator signal or receiving a clock signal, and the fourth connection line is used for receiving a voltage of speed signal, or receiving and outputting a programming data signal;
   a micro processing unit, having a plurality of pins and having a non-volatile memory, wherein the non-volatile memory stores a firmware used for driving the motor; and
   a function circuit, coupled to the input/output interface and the micro processing unit, and determining whether the micro processing unit enters a programming mode to update the firmware according to a magnitude of the operation voltage, wherein the function circuit comprises:
      a selector, switching a connection path between the third connection line and a second pin in the plurality of pins according to a control signal, or switching a connection path between the third connection line and a third pin in the plurality of pins;
      a voltage detector, coupled to the first connection line to receive the operation voltage, and outputting the control signal when the operation voltage is lower than a predetermined voltage, and outputting an enable signal to a first pin in the plurality of pins to make the micro processing unit to enter the programming mode.

2. The servo fan as claimed in claim 1, wherein when the control signal indicates that the operation voltage is lower than the predetermined voltage, the selector turns on the connection path between the third connection line and the second pin, such that the second pin receives the clock signal, and when the operation voltage is not lower than the predetermined voltage, the selector turns on the connection path between the third connection line and the third pin, such that the third pin receives the frequency generator signal.

3. The servo fan as claimed in claim 1, wherein the first pin is a reset pin.

4. The servo fan as claimed in claim 1, wherein the second pin and the third pin are respectively a programming clock pin and a frequency generator output pin.

5. The servo fan as claimed in claim 1, wherein the function circuit further comprises:
   a transmission unit, transmitting data to the micro processing unit in a non-distortion manner, wherein when the micro processing unit receives the enable signal, a fourth pin in the plurality of pins serves as an input pin of the programming data signal, and conversely a fifth pin serves as an input pin of the voltage of speed signal.

6. The servo fan as claimed in claim 1, wherein the micro processing unit and the function circuit are not integrated in one chip.

7. The servo fan as claimed in claim 1, wherein the operation voltage is an operation voltage of a programmer or an operation voltage of the motor.

8. A programming control method for a servo fan, comprising:
   providing an input/output interface and a micro processing unit, wherein the input/output interface comprises a first connection line, a second connection line, a third connection line and a fourth connection line, the first connection line is coupled to an operation voltage, the second connection line is coupled to a ground voltage, the third connection line is used for outputting a frequency generator signal or receiving a clock signal, and the fourth connection line is used for receiving a voltage of speed signal, or receiving and outputting a programming data signal, the micro processing unit has a plurality of pins and has a non-volatile memory, wherein the non-volatile memory stores a firmware used for driving a motor;

providing a function circuit for coupling to the input/output interface and the micro processing unit; and using the function circuit to determine whether the micro processing unit enters a programming mode to update the firmware according to a magnitude of the operation voltage; and outputting, by a voltage detector, an enable signal to a first pin in the plurality of pins when the operation voltage is lower than a predetermined voltage;

turning on, by a selector, a connection path between the third connection line and a second pin in the plurality of pins when the operation voltage is lower than the predetermined voltage; and turning on, by the selector, a connection path between the third connection line and a third pin in the plurality of pins when the operation voltage is not lower than the predetermined voltage.

9. The programming control method for the servo fan as claimed in claim 8, wherein the first pin is a reset pin.

10. The programming control method for the servo fan as claimed in claim 8, wherein the second pin and the third pin are respectively a programming clock pin and a frequency generator output pin.

11. The programming control method for the servo fan as claimed in claim 8, further comprising:

transmitting data to the micro processing unit in a non-distortion manner by the function circuit, wherein when the micro processing unit receives the enable signal, a fourth pin in the plurality of pins serves as an input pin of the programming data signal, and when the micro processing unit does not receive the enable signal, a fifth pin serves as an input pin of the voltage of speed signal.

* * * * *